United States Patent [19]

Hasegawa et al.

[11] Patent Number: 4,709,364
[45] Date of Patent: Nov. 24, 1987

[54] NETWORK PRIORITY DETERMINING METHOD

[75] Inventors: Toshiharu Hasegawa, No. 15-2, Fukakusa gansho-cho, Fushimi-ku, Kyoto-shi, Kyoto; Zai-ming Shen, Kyoto; Shoujiro Muro, Osaka; Shigeru Masuyama, Kyoto; Akihisa Toyooka, Osaka, all of Japan

[73] Assignees: Sumitomo Electric Industries, Ltd., Osaka; Toshiharu Hasegawa, Kyoto, both of Japan

[21] Appl. No.: 758,986

[22] Filed: Jul. 25, 1985

[30] Foreign Application Priority Data

Jul. 25, 1984 [JP] Japan ................................. 59-155941
Jul. 25, 1984 [JP] Japan ................................. 59-155942
Jul. 25, 1984 [JP] Japan ................................. 59-155943

[51] Int. Cl.[4] .............................................. H04J 3/02
[52] U.S. Cl. ....................................... 370/85; 370/89; 370/86
[58] Field of Search ............................ 370/85, 86, 89; 340/825.5

[56] References Cited

U.S. PATENT DOCUMENTS

| 4,454,508 | 6/1984 | Grow ................................... | 370/86 |
| 4,500,987 | 2/1985 | Hasegawa ............................. | 370/86 |
| 4,506,360 | 3/1985 | Kryskow, Jr. et al. ............... | 370/86 |
| 4,538,147 | 8/1985 | Grow ................................... | 370/89 |
| 4,566,097 | 1/1986 | Bederman ............................ | 370/86 |
| 4,593,282 | 6/1986 | Acampora et al. .................. | 370/85 |

Primary Examiner—Douglas W. Olms
Assistant Examiner—Wellington Chin
Attorney, Agent, or Firm—Sughrue, Mion, Zinn, Macpeak, and Seas

[57] ABSTRACT

A network priority determining system in which the percentage of utilization of the network transmission medium is significantly increased and the number and complexity of hardware components is reduced. When the network is not being used for transmission of data packets, a free token is circulated having a priority controlling field and a reservation field, while when the network is to be used for transmission, a busy token is circulated. To begin transmission, a network can catch a free packet if its priority level is equal to or less than that of the free token. The reservation field value and priority field value contained in the free token may be set in accordance with a reservation value of the previously circulated busy token.

11 Claims, 7 Drawing Figures

| P₂ | P₁ | P₀ | T | - | R₂ | R₁ | R₀ |
|----|----|----|---|---|----|----|----|

FIG. 6

| P_C0 | P_C1 | P_C2 | T | - | - | - | - |
|------|------|------|---|---|---|---|---|

NETWORK PRIORITY DETERMINING METHOD

BACKGROUND OF THE INVENTION

The present invention relates to a network priority determining system which, in a network in which various computers, terminals, etc., transmit data to one another, and in which a priority for transmitting terminals is established in such a manner as to efficiently operate the network with a minimized standby time.

A network system in which various computers, terminals, etc., transmit data to one another via a common line or lines requires a system for giving access (transmission rights) to nodes sequentially.

An example of such an access system is a system in which a certain frame (hereinafter referred to as "a free token" when applicable) is circulated through nodes sequentially wherein a node wishing to make a transmission request "catches" the token and changes it into a busy token, which is transmitted with a data packet. As described in IEEE Draft Standard 802.5, "Token Ring Access Method and Physical Layer Specifications", Sept. 23, 1983, a method has been proposed in which the order of priority is given to transmission packets in such a manner that a packet higher in priority is transmitted earlier. This method is carried out as follows:

(1) The token has a priority field P and a reservation field R, and each node writes these levels in respective registers $P_r$ and $R_r$ whenever it receives the token. (The levels contained in the respective fields and registers are designated by the same reference characters for convenience).

(2) If the priority of the free token is P, and the priority level $P_m$ of the transmission request packet of the node is higher than or equal to that of the free token, the free token is changed to a busy token for transmission of the data.

(3) After the packet is transmitted, the node outputs a free token. In this case, the levels of P and R are determined as follows:
(i) for $P_r > \max(R_r, P_m)$
$P = P_r$, $R = \max(R_r, P_m)$,
(ii) for $P_r < \max(R_r, P_m)$
$P = \max(R_r, P_m)$, $R = 0$,
where $P_r$ is the level held in the priority field register (indicating the present priority level), $R_r$ is the level of the reservation field register, $P_m$ is the priority level of the transmission request packet, P is the set level of the priority field of the transmitting token, R is the set level of the reservation field of the transmitting token, and "0" represents the lowest level of priority.

(4) The node which has increased the level of the priority field in the token stores the original level in a stack $S_r$ and the resultant level in a stack $S_x$. The number of stacks $S_r$ provided is equal to the available number of priority levels, as is the number of stacks $S_x$. This node is referred to as a stacking station.

(5) When the stacking station node confirms that none of the nodes have a packet whose level of priority is higher than that of the network outputted by the node, the level of priority is lowered as follows:
(i) In the case of $S_r > R_r$,
the stack $S_x$ is moved up, a token with $P = S_r$ and $R = R_r$ is transmitted, and the stack $S_r$ is moved up. When the stack $S_r$ has been depleted, the stacking station is released.
(ii) In the case of $R_r > S_r$,
the stack $S_x$ is moved up, a free token with $P = R_r$ and $R = 0$ is transmitted, and the level of P is placed in the stack $S_x$. (The stacking station is not changed.)

(6) The reservation field is revised when the following conditions are satisfied:
(i) the priority of the transmission request packet is lower than that of the network, and
(ii) the level $R_r$ of the reservation of the reservation field is lower than the level of the priority of the transmission request packet.

(7) In order to transmit the free token after the transmission of the data packet, the following operations are carried out:
(i) In the case of $P_r > R_r$ and $P_r > P_m$, in order to output a free token with $P = P_r$ and $R = \max(R_r, P_m)$, comparators (1), (2) and (3) are used to determine the relative levels of P and R.
(ii) In the case of $P_r < \max(R_r, P_m)$, in order to output the free token of $P = \max(R_r, P_m)$ and $R = 0$, the comparators (1), (2) and (3) are used for decision, to determine the levels of P and R. In this operation, the level of $P_r$ is placed in the stack $S_r$, and the level of P is placed in the stack $S_x$.

Figure 1:
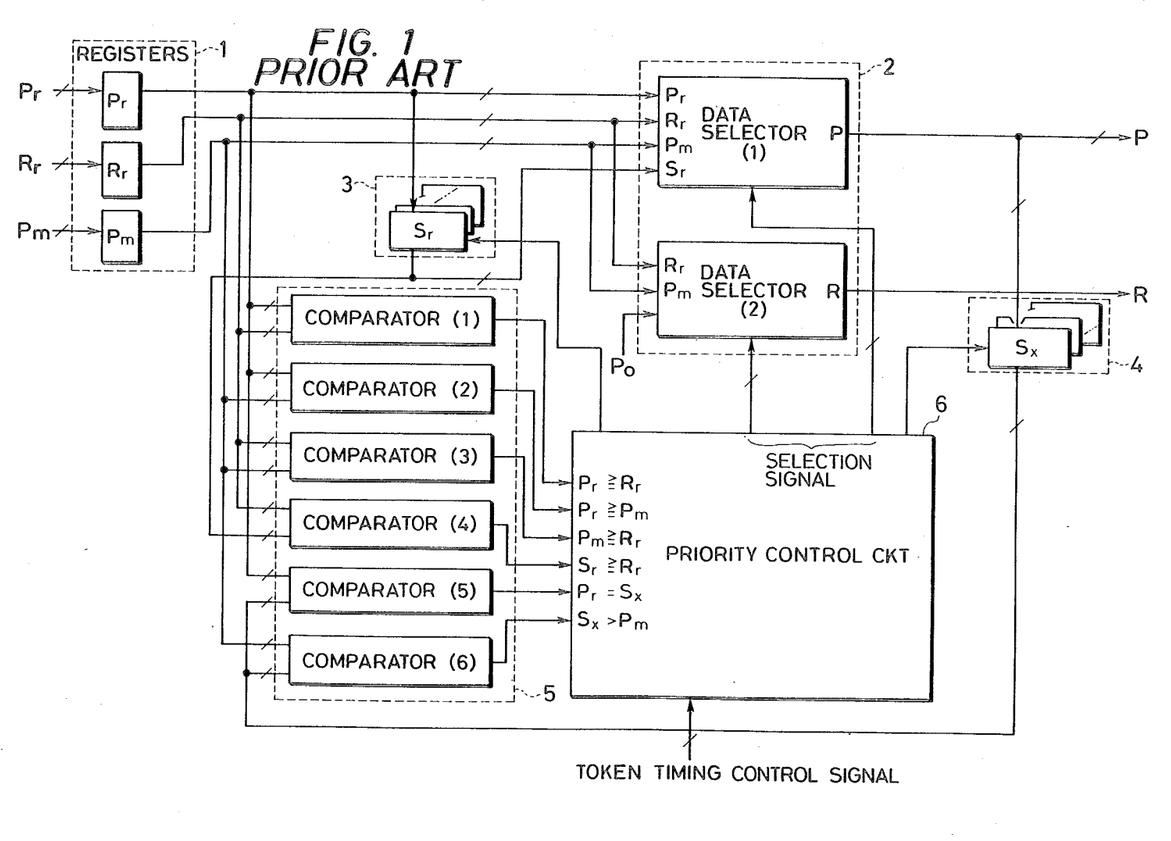
FIG. 1 is a block diagram of a conventional network priority level determining system.

FIG. 1 is a block diagram showing a priority determining system as described in IEEE Draft Standard 802.5, which is an example of the conventional priority determining system.

In FIG. 1, three registers 1 hold the latest token's priority level and reservation field level and a transmission request packet's priority level. Six comparators 5 are provided for comparison of the contents of the three registers 1 with the contents of stacks 3 and 4.

A priority level control circuit 6 performs the following operations according to the outputs of the comparators 5 and a token output timing signal:
(i) The circuit 6 determines the levels of $S_r$ and $S_x$.
(ii) The circuit 6 outputs a selection signal for determining the priority level P and the level R in the reservation field of the token to be transmitted. A data selector 2 operates to select the levels of P and R with the aid of the selection signal from the priority level control circuit 6. The height of the stacks $S_r$ and $S_x$ coincides with the available number of priority levels.

The operation in the case where the stacking station lowers the priority of the network will now be described.

If, in the case where the stacking station has no transmission data packet or the comparator 6 has found $P_m = S_x$, the comparator 5 determines that the priority level $P_r$ of a received free token is equal to $S_x$ then:
(i) when the comparator 4 determines $S_r > R_r$, the stack $S_x$ is moved up, a free token with $P = S_r$ and $R = P_r$ is transmitted, and the stack $S_r$ is moved up,
(ii) if $S_r < R_r$, a free token with $P = R_r$ and $R = 0$ is transmitted, and the level of P is placed in the stack $S_x$.
The level of the reservation field is renewed by establishing $R = P_m$ in the case where the comparator 2 has determined $R_r \geq P_m$ and the comparator 3 has determined $P_m \geq R_r$.

As described above, the levels of P and R are selectively determined by the data selector 2 with the aid of the output of the priority control circuit.

The above-described prior art method suffers from the following problems:
(i) Level of priority of the free token:
If, when the node outputs a free token whose priority is increased, and the present priority $P_r$ of the network is higher than the levels of $R_r$ and $P_m$, a free token of priority $P_r$ is outputted. If $R_r$ is lower than $P_r$, the probability is small that a data packet whose priority is higher than $P_r$ is present in other nodes. Therefore, the probability is high that the token will return to the node which has outputted the token, and hence an operation of lowering the priority is carried out.

If a priority of $P = \max(R_r, P_m)$ is employed in outputting the free token, the period of time for which the token circulates through the nodes without being caught is decreased, and therefore the efficiency of the network is increased.

(ii) Standby time when the level of priority is changed.

It is assumed that the priority level is changed in the order of "1", "2", "3", and "5". These changes mean that the priority of each of the stacking stations is increased by one step in sequence. Therefore, when it is required to lower the priority level "5" of the token to the priority "1", the priority level "5" must be lowered through the priority levels "3" and "2" to reach the priority level "1"; that is, it is impossible to decrease the priority level "5" directly to "1". Therefore, if only a packet having a priority level of "1" exists in the network, then the standby time which elapses until a free token is caught which allows transmission of the packet is about three times as long as in a case where the priority level is changed form "5" directly to "1".

Moreover, the method of determining the priority level according to data from the reservation field in the above-described system suffers from the following problems when the size of a data packet is large compared with the transmission speed of the network, that is, in the case where a long period of time is required for the transmission of the data packet and therefore a new transmission request packet occurs during the period of time:

(1) In the case where, in outputting a free token, the priority level has been determined according to the reservations made by the nodes, a significant period of time has passed after the reservations were made. Therefore, transmission request packets whose priority level are higher than the aforementioned priority level may occur in the nodes. In this case, a packet having higher priority should be dealt with earlier, but it is not.

(2) In the case of data such as audio data which should be especially high in real-time response, the delay characteristic fluctuates, causing distortion in the reproduced sound.

Still further, the above-described prior art system suffers from the following problems:

(i) Level of priority of the free token:

If, when the node outputs a free token whose priority level is increased, the present priority level $P_r$ of the network is higher than the levels of $R_r$ and $R_m$, a free token whose priority level is $P_r$ is outputted. If $R_r$ is lower than $P_r$, the probability is small that a data packet whose priority level is higher than $P_r$ is present in other nodes. Therefore, the probability is high that the token will return to the node which has outputted the token, whereupon the operation of lowering the priority is carried out.

If a priority level of $P = \max(R_r, P_m)$ is employed in outputting the free token, the period of time for which the token circulates through the nodes without being caught is decreased, and therefore the efficiency of the network is increased. Therefore, the probability is large that the token will return to its home node (the node which outputted the token) and its priority thus lowered.

If, in outputting a free token, the priority level is set to $P = \max(R_r, P_m)$, the period of time in which the token is circulated without being caught is decreased, with the result that the efficiency of the network is improved.

(ii) Change of the free token:

If the level of priority is changed in the order of "1", "2", "3", and "5", then it is necessary to lower it in the order of "5", "3", "2", and "1". That is, the priority is not lowered from "5" directly to "1". Therefore, if only packets of priority "0" are present in the network, the waiting time which elapses before the transmission-enabling free token is caught is about three times as long as that in the case where the priority is lowered from "5" directly to "1".

(iii) Each of the nodes (equal in number to the number of available priority levels) requires two stacks, and therefore the hardware is necessarily intricate. The number of stacks used at all times is no more than (the number of available priority levels) $\times 2$ in the overall network. This means that hardware circuits which are scarcely used must nevertheless be provided.

SUMMARY OF THE INVENTION

As object of the invention is therefore to solve the above-described problems accompanying a conventional access system.

In accordance with this and other objects, an access method is provided by the invention wherein a priority level is determined from the levels of $R_r$ and $P_m$. Therefore, the priority level can be changed immediately. Accordingly, it is unnecessary for the stacking station to perform this function. Thus, the time required for changing the priority level and for standby processing in outputting the free token is greatly reduced.

In accordance with another aspect of the invention, there is provided a priority level determining system in which a priority control field $P_c$ is provided in a token and utilized for both a free token and a busy token in the network, whereby the number of priority level bits in a frame is halved and the priority can be changed in an extremely short time.

DESCRIPTION OF THE PREFERRED EMBODIMENTS

The inventive access method will now be described in detail.

(1) A token is assumed to have a priority field P and a reservation field R, and each node writes its level in $P_r$ and $R_r$ whenever it receives the token.

(2) If the priority level of a free token is P, and the priority level $P_m$ of a transmission request packet of a node is higher than that of the free token, the free token is changed into a busy token to allow transmission of the data.

(3) After the packet is transmitted, the node outputs a free token. In this case, the levels of P and R are determined as follows:

(i) when the transmitting packet remains in the cue,
$P=\max (R_r, P_m)$
$R=0$, (ii) when no transmitting packet remains in the cue,
$P=R_r$
$R=0$.

(4) No stack is provided. (Changes in the priority levels are not stored.)

(5) The reservation field is revised when the following conditions are satisfied:

(i) the priority level of the transmission request packet is lower than that of the network; and (ii) the level $R_r$ of the reservation field is lower than the priority level of the transmission request packet.

When the transmission packet remains in the cue (as described in (3)(i)), the levels of P and R can be determined as follows:
$P=\max (R_r, P_m)$, and
$R=\min (R_r, \text{and } P_m)$.

Determining the levels of P and R in this manner has the advantage that the number of times of writing data in the reservation field is reduced because the data in the past circulation of the token remains in the reservation bits.

If is the above-described network priority determining method of the invention, in the case where a node exits from the cue of a transmission request packet after writing the priority level in the reservation field, a free token in which the priority level of the reservation field is shifted into the priority field circulates and all nodes have transmission request packets of lower priority, then the free token cannot be caught by the nodes, and therefore the circulation of the free token is continued. This difficulty may be eliminated by the following two methods:

(1) Control of the node which has transmitted the free token is utilized:

When the node outputs the free token, its level is stored in a register. The content of the register is reset when a busy token or a free token different in priority level is received. If, when a free token having the same priority level (other than the lowest priority level) is received before the register is reset and the priority level of the transmission request packet is lower than that of the free token, a new token is transmitted which has in its priority field the higher of the level of the reservation field of the free token and the priority level of the transmission request packet, and in its reservation field the lowest priority level. Accordingly, a free token having a priority level other than the lowest level of priority circulates continuously, which prevents the difficulty that, in other nodes, a packet lower in priority level is caused to wait for transmission.

(2) Monitor node is utilized;

A monitor node is provided in the network which detects when a free token whose priority is other than the lowest possible priority level has passed through the monitor node at least twice. In one example of such detection, whenever a free token whose priority is other than the lowest level passes through the monitor node, the content of the counter is increased by one, and when a busy token or a free token having the lowest priority passes through the monitor node, the counter is reset. Thus, when the content of the counter reaches a predetermined value (two), the circulation of a free token whose priority is other than the lowest level is detected. Upon detection of the circulation of this free token, similar to (i) above, the level of the reservation field is compared with the level of the priority of the transmission request packet of the monitor node, and a new free token is transmitted which employs the higher of the two values as the level in its priority field and which has in its reservation field the lowest priority.

Figure 3:
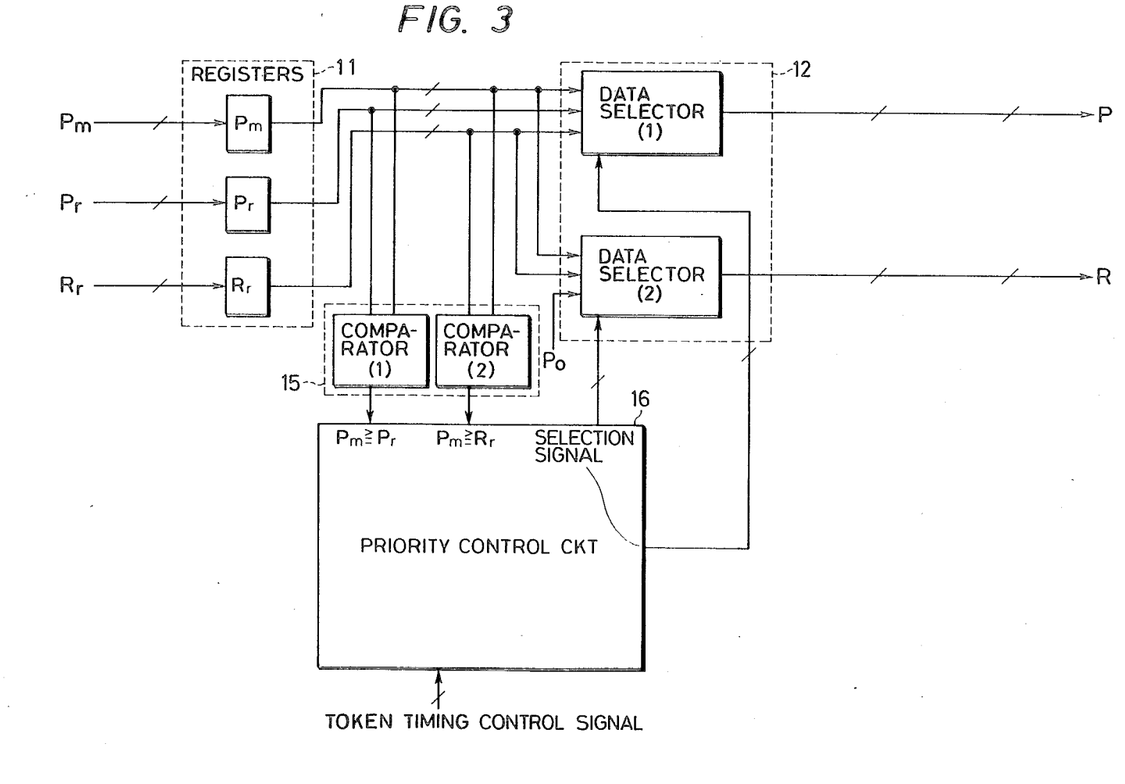
FIG. 3 is a block diagram of a network priority determining system according to a first embodiment of the invention.

FIG. 3 shows an example of a network priority level determining system according to this invention. In FIG. 3, three registers 11 hold the latest token's priority level and reservation field level, and a transmission request packet's priority level.

Two comparators 15 compare the level of $P_m$ with the levels of $P_r$ and $R_r$. A priority control circuit 16, receiving the outputs of the comparators 15 and a token output timing control signal, determines the levels of the priority level P and the reservation field level R of a token to be transmitted. Data selectors 12 select the levels of P and R in response to selection signals provided by the priority control circuit 16.

In outputting a free token, the output of the second comparator 2 is checked, and the first data selection is controlled so that, if $P_m > R_r$, the level of $P_m$ is provided as the level of P, and if $P_m < R_r$, the level of $R_r$ is provided as the level of P. At the same time, the second data selector is controlled to determine the level of R. When $P_m > P_r$, the level of $P_r$ is outputted as the level of R. When $P_m < P_r$, the level of $P_m$ is outputted as the level of R. (In the algorithm in which the level of R is put at the lowest place, $R=0$ is outputted.)

In the case of a busy token, the level of $P_r$ is outputted as the level of P, when $P_m > R_r$ the level of $P_m$ is outputted as the level of R, and when $P_m < R_r$ the level of $R_r$ is oututted as the level of R.

As is apparent from the comparison of the system of the invention with the conventional system, in the system of the invention, the number of comparators is smaller, the priority control circuit is simpler, and it is unnecessary to use stacks. That is, the system of the invention is much simpler in circuit arrangement than the conventional system.

In the network priority determining system of the invention, a node outputs a free token according to the levels of $R_r$ and $P_m$, and therefore the priority level can be inceased or decreased immediately. Accordingly, the system of the invention requires a shorter time for changing the priority levels than the conventional system in which a stacking station changes the degree of priority. Furthermore, since it is unnecessary to use stacks in the system of the invention, the hardware is considerably simplified.

A second embodiment of the invention will now be described. In accordance with this embodiment, the priority level of a free token is determined according to the following methods:

I. Describing the priority level one step at a time:

(1) When a node which has caught a free token and transmitted a data packet outputs a new free token, its priority is set to the highest available level.

(2) In the case where a free token having the highest available priority has circulated through the nodes and returned to the node which outputted the free token, namely, in the case where a busy token or free token whose priority level is other than the highest level have not been received, a free token whose priority level is next to the highest level is outputted.

(3) If the free token returns to its home node, the above-described operation is carried out until the priority level reaches the lowest available level.

If collection of reservation data is taken into account in outputting the free token of the highest priority, the following system is employed:

II. Using reservation data during circulation of a free token:

(1) When a node which has caught a free token and transmitted a data packet outputs a new free token, its priority is set to the highest available level, and the level of the reservation field is employed as the lowest priority level or the highest priority level of the transmission request packet of the node.

(2) When a free token of the highest priority level has circulated through the nodes and returned to its home node, the level of the reservation field is compared with the level of the priority of the transmission request packet of the home node. When the level of the reservation field is higher, the free token is transmitted with the level of the reservation field as its priority level. When the level of the priority of the transmission request packet is higher, the packet is transmitted.

A system of determining the priority level according to the second embodiment of the invention (hereinafter referred to as "system A") will be described.

A. (1) A free token has a priority field. Whenever each node receives a free token, the level from this field is written in register $P_r$.

(2) When the priority level $P_m$ of a transmission request packet of a node is higher than that of a free token, the free token is converted into a busy token, and the data packet transmitted.

(3) After the packet has been transmitted, the node outputs a free token. In this case, the priority of the free token is set to the highest level, and the node stores the transmitted priority level.

(4) When the node has received a free token whose priority level is equal to the transmitted priority level, namely, when the transmitted free token has returned to the node before a busy token or a free token whose priority level is other than the highest is received, the priority of the free token is decreased by one step and the free token is transmitted again. In this case also, the transmitted priority level is stored.

(5) Whenever the free token returns to its home node, its priority level is lowered to the next in sequence in the above-described manner.

(6) The stored priority level is reset when a busy token is received or when a free token of different priority is received.

(7) It is unnecessary to provide stacks.

(8) No reservation field is utilized.

If, in the above-described system, a reservation field is utilized in the circulation of the free token, and collection of the priority level data of the nodes is taken into consideration, then the following system (hereinafter referred to as "system B") may be provided:

B. (1) A free token has a priority level field and a reservation field, and whenever each node receives a free token, the levels thereof are stored as $P_r$ and $R_r$.

(2) When a free token has a priority level P, and the priority of a transmission request packet of a node is higher than P, the free token is converted into a busy token, and the data packet is transmitted.

(3) The levels of P and R at the time of transmission of a free token after the transmission of the data packet are as follows:

(i) P: highest priority level available
(ii) R: lowest priority level available (or the priority level of a transmission request packet of a node). In this operation, the transmission of a free token of the highest priority is stored.

(4) When a node receives a busy token or a free token whose priority is different from that of the transmitted free token, that is, when a free token returns to the home node which has transmitted the free token, the level of P is reset.

(5) When a node has received a free token whose priority is equal to that of the transmitted free token before receiving a busy token or a free token whose priority is different, the following free token is transmitted:

(i) P: the higher of the reservation field level and the highest of the priority levels of transmission request packets of the node.
R: the lowest available priority level (or the lower of the reservation field and the priority level of a transmission request packet of the node).

In this operation, the transmission of the free token of the highest priority is stored.

(6) Whenever the transmitted free token returns to its home node, the operation described in paragraph (5) is carried out.

(7) It is unnecessary to provide stacks.

The above-described system, being free from the operation of lowering the priority one step at a time, is effective in the case where it is required to greatly change the level of priority; that is, in such a case, the priority can be changed in a much shorter period of time.

The processing time can be further reduced by changing (5) above as follows:

When a node receives a free token whose priority is equal to that of the transmitted free token before receiving a busy token or a free token whose priority is different, the following operations are carried out:

(a) When the level of the reservation field is higher than the level of a transmission request packet of the node, the following free token is transmitted:
(i) P: the level of the reservation field
(ii) R: the lowest priority level or the priority level of a transmission request packet of the node.

(b) When the level of the reservation field is lower than the priority level of a transmission request packet of the node, the data packet is transmitted. After the transmission of the data packet, transmission of a free token is carried out (The operation described B. (3) above is carried out.)

Figure 4A:
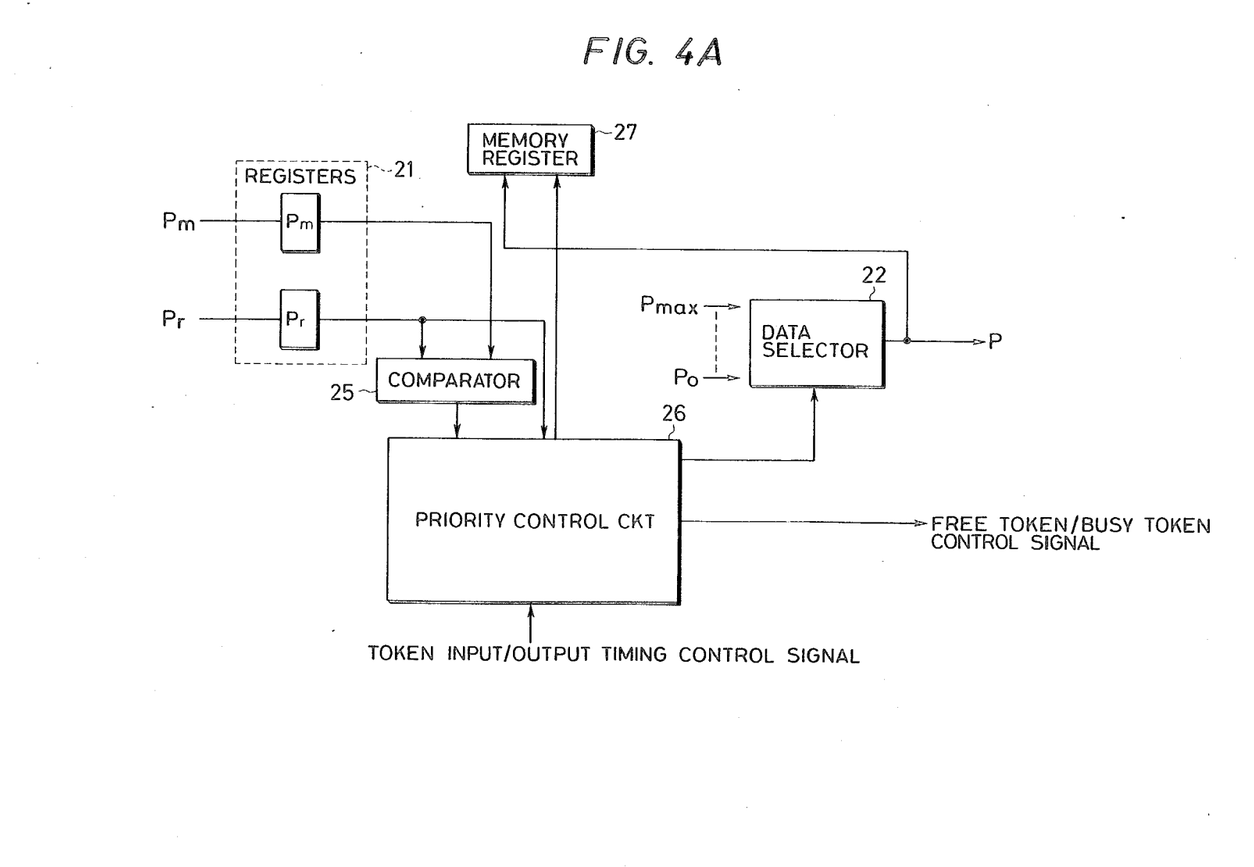
FIGS. 4A and 4B are block diagrams showing network priority level systems according to a second embodiment of the invention.

FIG. 4A shows an example of an implementation of system A. In this figure, a register 11 holds the latest free token's priority level and reservation field level, and a transmission request packet's priority level. A comparator 25 compares the level of $P_m$ with the level of $P_r$. A priority control circuit 26 receives the output of the comparator 25 and a token input/output timing control signal and in response outputs a selection signal for determining the priority level P of a token to be transmitted. In accordance with the selection signal provided by the priority control circuit 26, a data selector 22 selects the level of P. A memory register 27 temporarily stores the level of P. In the case where a free token is outputted after a data packet has been transmitted, the priority control circuit cause the data selector to output the highest priority level $P_{max}$. When a free token transmitted by a node is returned to the node, the priority thereof is returned to the next lower level. The levels for a transmitted free token are stored in the memory register 27, and the latter is reset when a busy token is received or a free token whose level of priority is different.

The comparator 25 is used when, at the time of receiving a free token, it is determined whether or not the data packet can be transmitted, and the free token is converted into a busy token. (A free token/busy token control signal is set to the busy-token state.)

Figure 4B:
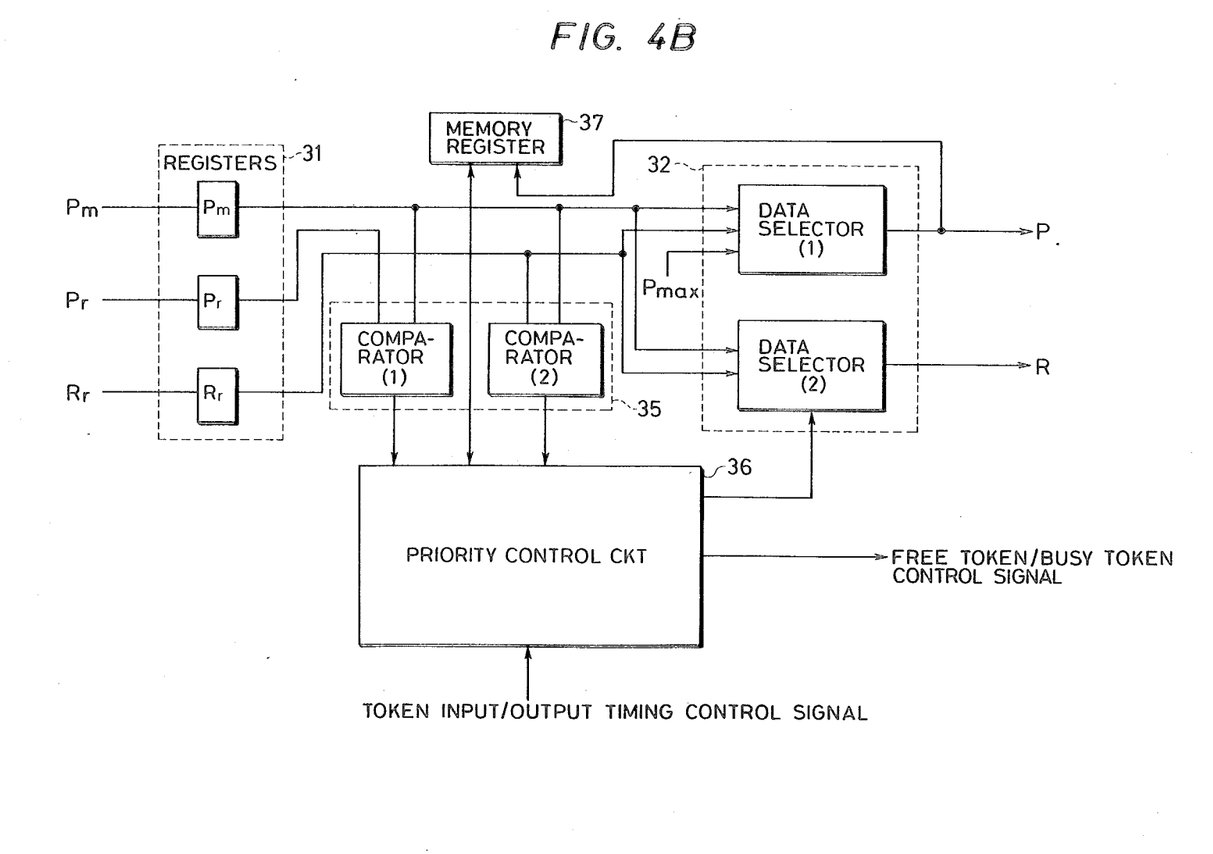

FIG. 4B shows an example of an implementation of system B discussed above. In FIG. 4B, a register 31 holds the latest free token's priority level and reservation field value, and a transmission request packet's priority level.

A comparator 35 compares the level of $P_m$ with the levels of $P_r$ and $R_r$. A priority control circuit 36 receives the outputs of the comparator 35 and a token output timing control signal and in response outputs a selection signal for determining the priority level P and the level of the reservation field R of a token to be transmitted. A data selector 32 select the levels of P and R in response to a selection signal outputted by the priority control circuit 36. A memory register 37 temporarily stores the level of P.

When a free token is outputted after the transmission of a data packet, the first data selector (1) is set to output the highest priority level $P_{max}$. When a free token has returned to its home node which transmitted the free token, the output of the second comparator (2) is checked, and the data selector (1) is set so that it outputs the level of $P_m$ as P when $P_m > P_r$, and outputs the level of $R_r$ as P when $P_r < P_m$. At the same time, the second data selector (2) is controlled to determine the level of R.

When $P_m > R_r$, the level of $R_r$ is selected, and when $P_m < R_r$, the level of $P_m$ is selected. If the level of R is held at the lowest possible level at all times, the second data selector (2) can be eliminated.

The level for the transmitted free token is stored in the memory register 37, which is reset by the priority control circuit when a free token of different priority or a busy token is received.

The second comparator (2) is used also when, at the time of receiving a free token, it is determined whether or not a data packet can be transmitted and the priority level control circuit changes the free token to a busy token. (The free token/busy token control signal is set to the busy mode.)

As is apparent from the above-description of FIGS. 4A and 4B, in the system of the invention, the number of comparators is smaller and the priority control circuit is simpler than those in the conventional system. Especially, in the system of the invention, unlike the conventional system, no stacks are used. That is, the system of the invention is much simpler in arrangement than the conventional system.

The embodiment of the invention has the following advantageous effects:

(1) Even when the size of a transmitting packet is large compared with the speed of transmission of the network, because the highest level of priority is employed in outputting the free token, a transmitting packet of highest priority is always transmitted first.

(2) When system B is employed, the reservation field also is used. Therefore, the time required for decreasing the priority successively is reduced.

(3) It is unnecessary to perform a processing operation with respect to a busy token. Therefore, no mechanism or time for processing a busy token is required.

A third embodiment of the invention will now be described.

(1) A token used in this embodiment has a priority control field $P_c$. This field is used for indicating the priority level of the network in the case of free token, and it is used for reservation in the case of a busy token.

(2) When the priority level $P_m$ of a transmission request packet of a node is larger than the priority level P of a free token, the free token is converted into a busy token to effect the transmission of data.

(3) After transmitting the packet, the node outputs a free token. In this operation, the level of $P_c$ is determined as follows (here, $R_r$ is the level which is obtained by circulating the busy token; other symbols are the same as above):

(i) When a node has a transmission data packet,
$P_c = \max(P_r, P_m)$.
(ii) When a node has no transmission data packet,
$P_c = P_r$.

(4) Changing of the level of priority is not stored. Accordingly, no stacks are provided.

(5) The priority control field of the busy token is changed only when the priority level of the transmission request packet is higher than that of the priority control field.

As is apparent from the above description, when a node outputs a free token, the level of $P_c$ is determined according to the levels of $P_r$ and $P_m$. Therefore, in the system of the third embodiment of the invention, compared with the conventional system in which a stacking station is used to determine the level of the priority control field, the time required for changing the priority is short and the hardware is simple since the stacks are eliminated. Furthermore, since the priority control field is used both for indication of the priority of the network and for reservation, the number of bits in the frame can be halved.

As is clear from the above description, if, when a node leaves the cue of a transmission request packet after writing the priority level in the reservation field and a free token, into the priority level field to which the priority level of the reservation field has been transferred, circulates through the network, the priority levels of transmission request packets of all the nodes are lower than that of the token being circulated, and hence the free token is continuously circulated through the network without being caught.

This difficulty can be eliminated by the following methods:

(i) When the node outputs the free token, its value is stored in the register. The content of the register is reset when a busy token or a free token of different priority is received. If, when a free token having the same priority (other than the lowest priority) is received before the register is reset and the node has a transmission request packet, a new free token having the same priority is transmitted, and if, under the same condition, the node has no transmission request packet, a free token having the lowest available priority is transmitted.

(ii) A monitor node is provided in the network which detects when a free token whose priority level is other than the lowest possible priority level has passed through the monitor node at least twice. In the example of the detecting method, whenever a free token whose priority is other than the lowest passes through the monitor node, the content of the counter is increased by one, and when a busy token or a free token having the lowest priority passes through the monitor node, the counter is reset. Thus, when the count value of the counter reaches the predetermined value (two), the circulation of a free token whose priority is other than the lowest is detected.

Immediately upon detection of the circulation of this free token, a free token is transmitted as follows: If, as in (i) above, the monitor node has a transmission request packet, a free token whose priority control field is made to have the level of priority of the packet is transmitted, and if the monitor node has no transmission request packet, a free token whose priority control field is made to have the lowest priority is transmitted.

Figure 5:
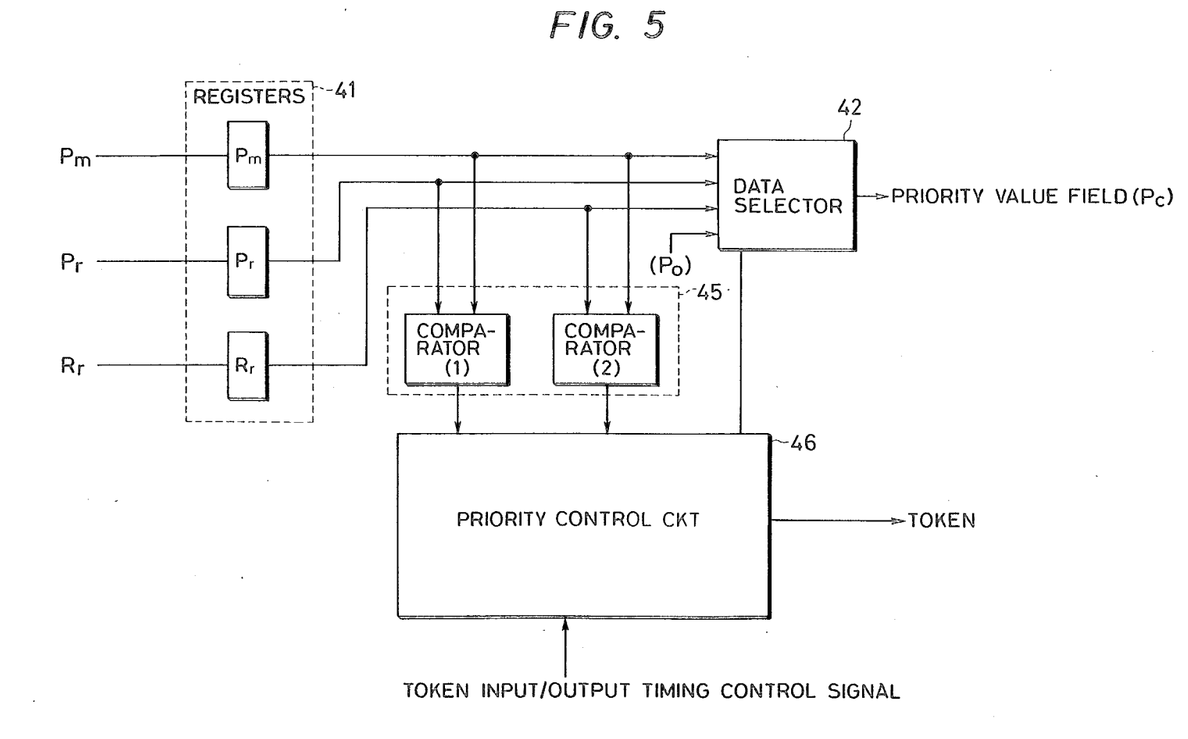
FIG. 5 is a block diagram showing a network priority determining system in accordance with a third embodiment of the invention.

FIG. 5 shows the arrangement of an implementation of a priority determining system according to the third embodiment of the invention.

In FIG. 5, registers 4 hold the priority level $P_m$ of the latest free token, and the priority level of a transmission request packet. A comparator (1) of a pair of comparators 45 compares the level of $P_m$ with the level of $P_r$, and a comparator (2) compares the level of $P_m$ with the level of $R_r$. A priority level control circuit 46 receives the outputs of the comparators and a token output timing control signal and in response outputs a selection signal for determining the priority level P and the level R of the reservation field of a token to be transmitted. A data selector 42 receives the selection signal from the priority level control circuit and in response sets a priority level control field $P_c$.

In outputting a free token, the output of the comparator (2) is checked, and the data selector is controlled so that if $P_m > R_r$, the level of $P_m$ is outputted for $P_c$, and if $P_m < R_r$, the level of $R_r$ is outputted for $P_c$.

In outputting a busy token, for the level of the priority level control field $P_c$:
(i) the lowest priority level $P_0$ is outputted, or
(ii) when the node has a transmission request packet, its priority level $P_m$ is outputted.

Figure 2:
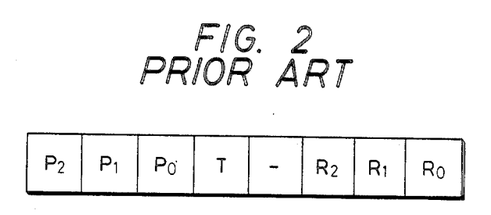
FIG. 2 is a diagram showing an example of a token frame used in the conventional system of FIG. 1.
Figure 6:
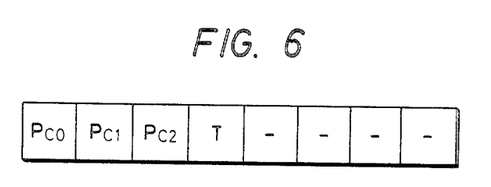
FIG. 6 shows the arrangement of a token frame employed in the system of FIG. 5.

FIG. 2 shows an example of a token frame in the conventional system, and FIG. 6 shows an example of a token frame in the system of the invention. As is apparent from a comparison of FIGS. 2 and 6, the capacity of the priority control field in the system of the invention can be half the capacity of the priority control field in the conventional sytem.

In the priority determining system of the third embodiment of the the number of comparators is small and the priority control circuit is simple compared with the conventional system. Furthermore, in the system of the third embodiment of the invention, as in the case of the first and second embodiments, it is unnecessary to use stacks. That is, the system of the invention is much simpler than the conventional system. In addition, the number of bits used for priority control can be half that of the conventional system.

We claim:

1. A network priority determining method wherein free tokens and busy tokens are circulated among a plurality of nodes connected in a network, each token having a priority indication field for controlling a priority level and a reservation field for reserving transmission, said method comprising the steps of:
    circulating a first free token;
    at one of said nodes, transmitting a data packet in response to said first free token;
    during said step of transmitting, circulating from the transmitting node a busy token;
    comparing at the transmitting node, the reservation field of said busy token with the priority level of said data packet; and,
    circuiting from the transmitting node a second free token, said second free token having in its priority indication field the higher one of said reservation field of said busy token and the priority level of said data packet in said comparing step and in its reservation field the lowest available priority level.

2. The method as claimed in claim 1, further comprising the step of:
    comparing the reservation field of said busy token with said priority level of said data packet; and employing the lower one of said reservation field of said busy token and said priority level of said data packet from said comparing step as said reservation field of said second free token.

3. The method as claimed in claim 1, further comprising the steps of:
    detecting return of said free token to said one node;
    comparing the level of said reservation field of said free token with said priority level of said data packet;
    and setting as said priority level of said priority indication field of said second free token the higher one of said reservation field of said free token and said priority level of said data packet, and as said reservation field of said second free token, the lower one of said reservation field of said free token and said priority level of said data packet.

4. The method as claimed in claim 1, wherein a monitor node is provided in said network, said method further comprising the steps of:
    detecting at said monitor node when a free token having a priority other than the lowest available priority level has circulated through said network at least once;
    comparing the level of the reservation field of said free token with the priority level of a packet of which transmission has been requested by said monitor node;
    establishing the higher one of said reservation field of said free token and said priority level of said packet as a priority level in said priority indication field of said free token; and
    establishing as the level of said reservation field of said free token, the lowest available priority level.

5. A method for assigning transmission rights to ones of a plurality of nodes connected in a transmission network, comprising the steps of:
    (1) circulating a token among said nodes when said network is available for data packet transmission, said token having a priority controlling field;
    (2) catching said token at a node having a transmission request packet with a priority equal to or higher than that which is contained in said priority controlling field of said token;
    (3) transmitting a data packet from said node;
    (4) after transmission of said data packet, transmitting from said node a new token having a priority controlling field containing the highest available priority level;
(5) if said new token returns to said node without being caught by another node, lowering said priority controlling field by one priority level; and
(6) repeating said steps (1) through (5) until said data packet is caught by a node.

6. A method for assigning transmission rights to one of a plurality of nodes connected in a transmission network, comprising the steps of:
   (1) circulating a token among said nodes when said network is available for data packet transmission, said token having a priority controlling field and a reservation field;
   (2) catching said token at a node having a transmission request packet with a priority level equal to or higher than the level contained in said priority controlling field of said token;
   (3) transmitting a data packet from said catching node;
   (4) after transmission of said data packet, transmitting from said catching node a new token having a priority controlling field containing the highest available priority level;
   (5) if said new token is returned to said catching node without being caught by another node, setting said priority controlling field of said new token to the highest one of the priority level of the reservation of said token and the priority level of the transmission request packet of said catching node; and
   (6) repeating said steps (1) through (5) until said packet is caught by a node.

7. The method as claimed in claim 6, further comprising the step of;
   if said new token is received at said node without being caught by another node, immediately transmitting a transmission request packet having a priority higher than the priority contained in said reservation field of said token.

8. A method for assigning transmission rights to ones of a plurality of nodes connected in a communications network, comprising the steps of:
   circulating among said nodes in said network, when data packets are not being transmitted on said network, a free token having a priority controlling field for indicating a priority level of said network;
   when one of said nodes has a data packet to transmit, catching said free token and transmitting a data packet if a priority level of said node is equal to or greater than said priority level contained in said priority controlling field of said free token;
   transmitting a busy token from said node at the time of transmission of said data packet;
   at any of said nodes, setting a reservation level in said busy token as said busy token is circulated through said network; and
   after completion of transmission of said data packet, circulating from said transmitting node, a new free token having in its priority controlling field a level which is the highest one of the reservation level contained in said busy token circulated through said network and the priority level of the transmission request packet of said transmitting node, said busy token having a priority set to a lowest available priority level.

9. The method as claimed in claim 8, wherein, when said busy token is circulating, at a node having a transmission request packet, setting as the priority level of said transmission request packet said priority level contained in said priority controlling field of said busy token.

10. The method as claimed in claim 8, which further comprises the step of:
    when said free token is returned to said node which originally transmitted said free token without being caught by another node, employing said priority level contained in said priority control field as the priority level of the transmission request data packet of said node if a transmission request packet is present in said node, and if no transmission request data packet is present, circulating a new free token having the lowest available priority level contained in said priority controlling field.

11. The method as claimed in claim 10, wherein a monitor node is provided in said network, said method further comprising the steps of:
    detecting at said monitor node, when a free token having a priority level contained in said priority level controlling field of other than the lowest available priority level, has circulated through said network at least once without being caught by any of said nodes;
    if said monitor node has a transmission request packet, transmitting from said monitor node a new free token having a priority level contained in said priority containing field equal to the priority level of said transmission request packet; and
    if said monitor node has no transmission request packet, circulating a new free token having the lowest available priority level contained in said priority controlling field.

* * * * *